(12) United States Patent
Champion et al.

(10) Patent No.: US 7,254,108 B2
(45) Date of Patent: Aug. 7, 2007

(54) STORAGE DEVICE INCLUDING A PROBE HAVING AN ELECTRICALLY CONDUCTIVE TIP PORTION FOR ELECTRICAL CONTACT WITH A STORAGE MEDIUM

(75) Inventors: Corbin L. Champion, Pullman, WA (US); Sarah M. Brandenberger, Boise, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 607 days.

(21) Appl. No.: 10/800,502

(22) Filed: Mar. 15, 2004

(65) Prior Publication Data

US 2005/0201258 A1    Sep. 15, 2005

(51) Int. Cl.
*G11B 7/00* (2006.01)

(52) U.S. Cl. .......................... 369/126; 369/100
(58) Field of Classification Search ............. None
See application file for complete search history.

(56) References Cited

U.S. PATENT DOCUMENTS

| | | | |
|---|---|---|---|
| 5,345,815 A | 9/1994 | Albrecht et al. | |
| 5,835,477 A | 11/1998 | Binnig et al. | |
| 5,856,967 A | 1/1999 | Mamin et al. | |
| 6,084,849 A * | 7/2000 | Durig et al. | 369/126 |
| 6,218,086 B1 * | 4/2001 | Binnig et al. | 369/43 |
| 6,233,206 B1 | 5/2001 | Hamann et al. | |
| 6,370,107 B1 | 4/2002 | Hosaka et al. | |
| 6,473,361 B1 | 10/2002 | Chen et al. | |

FOREIGN PATENT DOCUMENTS

| | | | |
|---|---|---|---|
| EP | 468456 A | * | 1/1992 |
| EP | 1130578 A2 | * | 9/2001 |
| JP | 08297870 A | * | 11/1996 |

OTHER PUBLICATIONS

Vettiger and Binnig, Scientific American, "The Nanodrive Project," pp. 47-51, 53 (Jan. 2003).

* cited by examiner

*Primary Examiner*—Andrea Wellington
*Assistant Examiner*—Jorge L. Ortiz-Criado

(57) ABSTRACT

A storage device includes a probe having a tip, the tip comprising a first portion and a second portion. The storage device also includes a storage medium having a surface, where the tip of the probe is adapted to form a dent in the storage medium. The second portion of the tip is electrically contacted to the surface of the storage medium in response to the tip being engaged in the dent, and the second portion of the tip is spaced apart from the surface of the storage medium in response to the first portion being engaged on the surface of the storage medium and not engaged in the dent.

16 Claims, 3 Drawing Sheets

STORAGE DEVICE INCLUDING A PROBE HAVING AN ELECTRICALLY CONDUCTIVE TIP PORTION FOR ELECTRICAL CONTACT WITH A STORAGE MEDIUM

BACKGROUND

In computing systems, such as desktop computers, portable computers, personal digital assistants (PDAs), servers, and others, storage devices are used to store data and program instructions. One type of storage device is a disk-based device, such as a magnetic disk drive (e.g., a floppy disk drive or hard disk drive) and an optical disk drive (e.g., a CD or DVD drive). Disk-based storage devices have a rotating storage medium with a relatively large storage capacity. However, disk-based storage devices offer relatively slow read-write speeds when compared to operating speeds of other components of a computing system, such as microprocessors and other semiconductor devices.

Another type of storage device is a solid state memory device, such as a dynamic random access memory (DRAM), static random access memory (SRAM), flash memory, and electrically erasable and programmable read-only memory (EEPROM). Although solid state memory devices offer relatively high read-write speeds, usually on the order of nanoseconds, they have relatively limited storage capacities.

With improvements in nanotechnology (technology involving microscopic moving parts), other types of storage devices are being developed. One such storage device is based on atomic force microscopy (AFM), in which one or more microscopic scanning probes are used to read and write to a storage medium. Typically, a scanning probe has a tip that is contacted to a surface of the storage medium. Storage of data in the storage medium is based on perturbations created by the tip of the probe in the surface of the storage medium. In one implementation, a perturbation is a dent in the storage medium surface, with a dent representing a logical "1," and the lack of a dent representing a logical "0." Other types of perturbations that can be created in the surface of the storage medium include creating or altering the topographic features or composition of the storage medium, altering the crystalline phase of the medium, filling or emptying existing electronic states of the medium, creating or altering domain structures or polarization states in the medium, creating or altering chemical bonds in the medium, employing the tunneling effects to move and remove atoms or charge to or from the medium, or storing/removing charge from a particular region.

Traditionally, for a probe to read data bits from a storage medium in which dents have been formed, the probe is heated to a predetermined temperature, such as 400° C. When a scanning tip of the probe encounters and enters a dent, the tip transfers heat to the storage medium, which causes the temperature of the probe tip to fall, which in turn causes electrical resistance of the tip to fall. The fall in resistance, which is a relatively tiny amount, is detected by detection circuitry to determine the state of a data bit. Another technique for detecting the state of a data bit involves the use of a piezoresistive element in the probe. When the probe tip encounters a dent, the cantilever of the probe deflects, which causes the resistance of the piezoresistive element to change. The change in resistance is measured by detection circuitry. However, with the above techniques, the variation in resistance due to the presence and absence of a dent is relatively small. As a result, reliable detection of data bits may not always be possible due to the presence of noise and other factors. Also, the speed at which read operations can be performed is also reduced due to weak read signals in probe-based storage devices.

DETAILED DESCRIPTION

Figure 1:
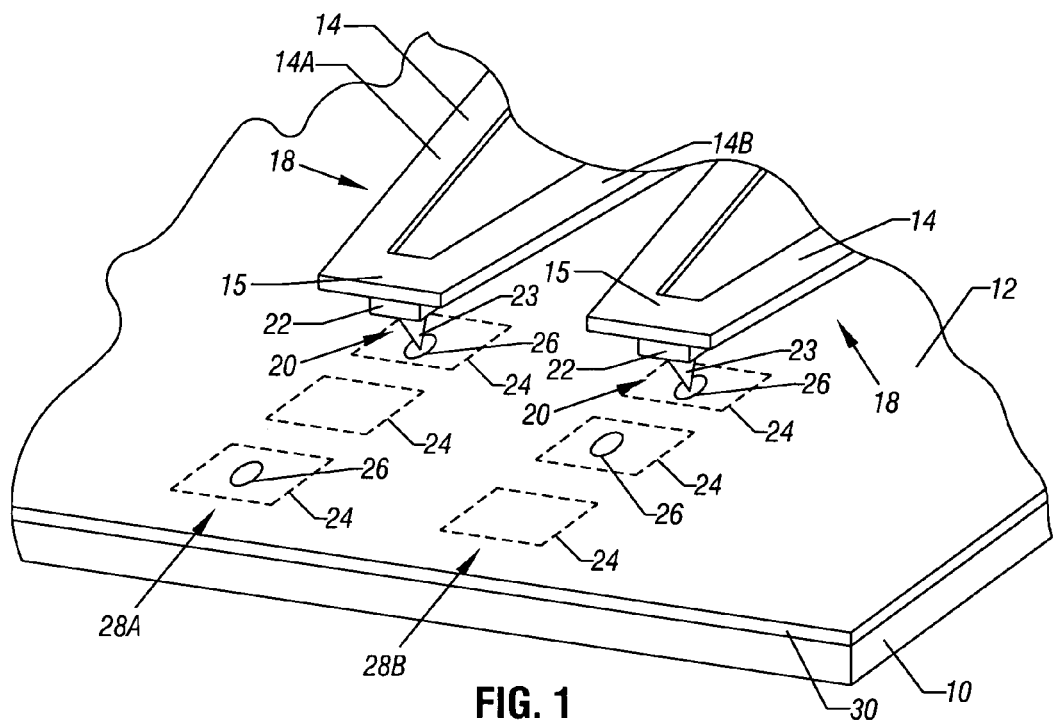
FIG. 1 illustrates a portion of a probe-based storage device that includes a storage substrate defining a storage medium, along with a probe having an electrically conductive tip portion for interacting with an electrically conductive portion of the storage medium, in accordance with an embodiment of the invention.

FIG. 1 shows an example probe-based storage device that includes a storage substrate 10 that provides a storage medium. As used here, the term "storage medium" refers to any medium in which storage cells are capable of being formed. The storage medium can make up a portion of the storage substrate 10, or the storage medium can be considered to be the whole storage substrate 10.

The storage medium has a storage surface 12 on which perturbations can be formed by tips 20 of respective probes 18. The tip 20 of each probe 18 is attached to and extends outwardly from a cantilever 14 of the probe 18. According to some embodiments, each probe 18 is a very small probe (on the order of micrometers, nanometers, or even smaller) that is built using nanotechnology techniques. Such a probe is referred to as a microscopic probe or nanotechnology probe.

In the implementation depicted in FIG. 1, the cantilever 14 of each probe 18 has two sections 14A and 14B that join at an end portion 15. The tip 20 protrudes from the end portion 15 of the cantilever 14. The tip 20 has two portions: a base portion 22 that is formed of an electrically conductive material; and a second portion 23 formed of an electrically insulating material that depends from the base portion 22. The base portion 22 of the tip 20 is attached to the cantilever 14 of the probe 18. The second portion 23 of the tip 20 is arranged to contact the storage surface 12.

In accordance with some embodiments of the invention, a layer 30 of the storage substrate 10 that is adjacent the storage surface 12 is also formed of an electrically conductive material. This layer 30 of the storage substrate 10 forms at least part of the storage medium. As explained further below, the electrically conductive base portion 22 of the tip 20 is able to interact with the electrically conductive layer 30 of the storage substrate 10 to perform detection of whether storage cells 24 on the storage substrate 10 have a first storage state or a second storage state.

FIG. 1 shows an array of storage cells 24. Note that a large number of storage cells 24 can be provided by the storage substrate 10, with six such storage cells 24 shown in FIG. 1 for purposes of illustration. In each storage cell 24, the tip 20 of a probe 18 can cause formation of a dent 26, which is basically a pit or hole that is formed into the layer 30. In the arrangement of FIG. 1, a first probe 18 is used to interact with storage cells 24 along a first column 28A, whereas a second probe 18 is used to interact with storage cells 24 along a second column 28B. In the first column 28A, a dent 26 is formed in one of the depicted storage cells 24, but no dent is formed in the other two depicted storage cells 24. In the second column 28B, dents 26 are formed in two of the depicted storage cells 24, with no dent formed in the other depicted storage cell 24. As illustrated in FIG. 1, the tip 20 of the probe 18 in the first column 28A is engaged in a dent 26, whereas the tip 20 of the probe in the second column 28B is engaged on the storage surface 12 but not in a dent (due to the absence of the dent in the corresponding storage cell 24).

In response to the tip 20 of a probe 18 being engaged in a dent 26, the base portion 22 of the tip 20 electrically contacts the storage surface 12 to enable electrical communication between the probe 18 and the storage medium. On the other hand, in response to the tip 20 of a probe 18 being engaged on the storage surface 12 but not in a dent, the base portion 22 is electrically isolated (by being spaced apart) from the storage surface 12 such that no electrical communication occurs between the probe 18 and the storage medium.

The presence of a dent 26 in a storage cell represents a first storage state (e.g., logical "1"), while the absence of the dent represents a second storage state (e.g., logical "0"). To write to the storage medium, a probe 18 is scanned across the storage surface 12, with the tip 20 heated and contacted to selected positions on the storage medium to form corresponding dents 26. To read from the storage medium, the probe 18 is also scanned across the storage medium. Detection of whether a dent is present or not in a storage cell 24 is based on detection of electrical communication (or lack thereof) between the probe 18 and the electrically conductive layer of the storage substrate 10 (which is part of the storage medium).

By employing the structure according to some embodiments of the invention, a relatively strong signal difference exists between a first measured signal in response to a dent being present in a storage cell 24, and a second measured signal in response to a dent not being present in a storage cell 24. The presence of a dent is indicated by electrical communication (in the form of a voltage signal or a current signal) between the storage medium and the probe 18, while the absence of a dent is indicated by no electrical communication (lack of a voltage signal or current signal) between the storage medium and the probe 18. This relatively large difference in measured signals allows for more reliable detection of data bits on the storage medium provided. Also, faster reading speeds can be achieved because of the more reliable reading capability.

To create a dent 26, the tip 20 of a probe 18 is locally heated to a predetermined temperature (e.g., up to about 400° C. or greater) for some amount of time. The heat from the tip 20 melts the storage surface 12 at the contact point of the tip 20. When a force is applied onto the probe 18 against the storage surface 12, the tip 20 imprints the dent 26. The applied force can be an incremental, applied force, or alternatively, a constant force due to the elastic nature of the cantilever 14. For example, the storage device can be assembled such that the cantilever 14 is bent back a little and thus applies constant force on the storage surface 12.

Once a dent 26 is formed, the dent can be erased by also using the tip 20. During erase, the tip 20 engages the dent 26, with the tip 20 being heated locally to melt the materials surrounding the dent 26 such that the material flows into the dent 26 to remove the dent. Alternatively, instead of using the tip 20 to erase a dent, a local heat source can be provided underneath the storage medium in the storage substrate 10, with the heat source heated to melt the material surrounding the dent to reflow material back into the dent. Examples of such local heat sources include resistors or other heating elements.

To enable creation of the dent 26, the layer 30 adjacent the storage surface 12 is formed of a relatively soft material, such as a polymer, e.g., polymethylmethacrylate (PMMA), or other suitable material. In addition, to provide electrical conductivity, the layer 30 is doped with electrically conductive elements.

Figure 2:
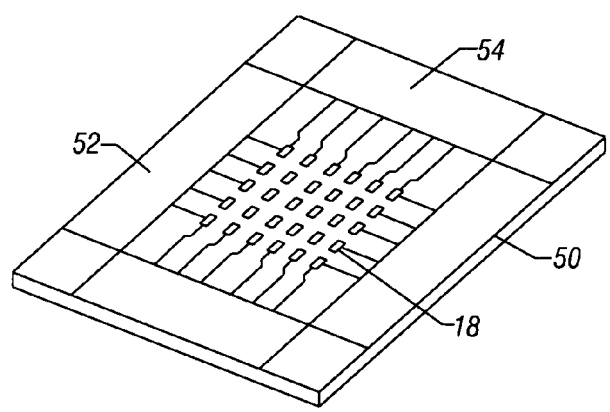
FIG. 2 is a schematic diagram of a probe substrate containing an array of probes and peripheral circuitry to interact with such probes in the probe-based storage device of FIG. 1.

FIG. 2 illustrates a probe substrate 50 that includes an array of probes 18 formed in the substrate 50. Peripheral circuitry 52 and 54 are provided on the peripheral sides of the probe substrate 50. For example, peripheral circuitry 52 and 54 can drive X and Y select lines to select bits of the storage array to read from or write to. A row of probes 18 may be activated by the select lines to read from or write to storage cells that the probes are in contact with. This structure enables concurrent access of multiple cells in one operation, which improves access speeds. Alternatively, one of the probes may be activated to read from or write to one storage cell. The peripheral circuitry 52 and/or 54 also include sensing devices and decoders to detect analog signals (signals indicating whether electrical communication exists between the probe 18 and the storage medium) from the probes and to convert the analog signals to a digital representation of a logical "0" or a logical "1."

Figure 3:
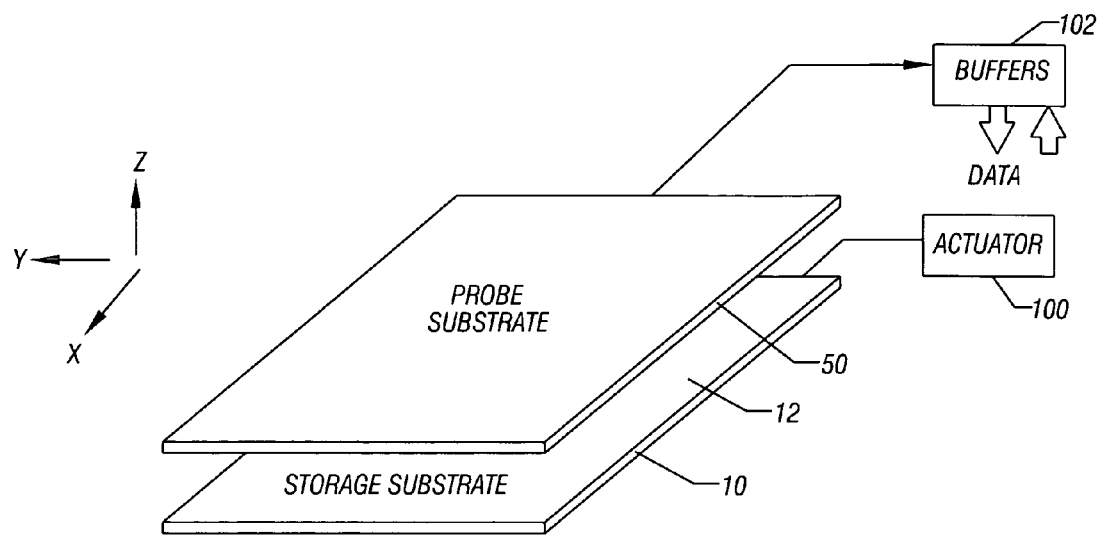
FIG. 3 illustrates the probe substrate positioned to face the storage substrate in the probe-based storage device of FIG. 1.

As shown in FIGS. 1 and 3, the probe substrate 50 is placed with the surface containing the probes 18 facing the storage surface 12 of the storage substrate 10, on which the storage cells are formed. The probe substrate 50 is positioned over the storage substrate 10 so that the probe tips 20 (FIG. 1) of the probes 18 point downwardly to engage the storage surface 20 of the storage substrate 10. In an alternative arrangement, the storage substrate 10 is positioned over the probe substrate 50 so that the probe tips 20 point upwardly to face the storage surface 12. In other arrangements, the probe substrate 50 and the storage substrate 10 can have a lateral or diagonal relationship.

The storage substrate 10, in the example of FIG. 3, is coupled to an actuator 100 that is designed to move the storage substrate 10 in both X and Y directions such that probes 18 (FIG. 1) can be placed over desired storage cells on the storage substrate 10. Data sensed by the probes 18 is provided to buffers 102, which store output data for retrieval by an external device. The buffers 102 may also store write data to be written to storage cells 24 (FIG. 1) in the storage substrate 10.

Alternatively, the actuator 100 is operatively coupled to move the probe substrate 50, or to move both the probe substrate 50 and the storage substrate 10. The actuator 100 is also able to move the probe substrate 50 and/or the storage substrate 10 in the Z direction, which is generally perpendicular to the X and Y directions.

Figure 4:
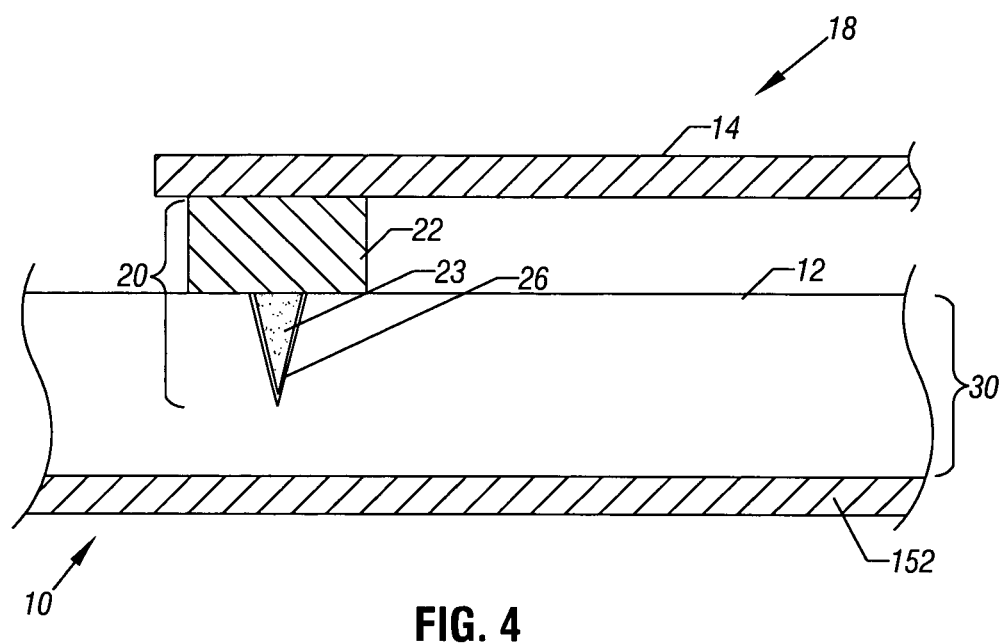
FIG. 4 is a cross-sectional view of the probe and storage medium of FIG. 1, where the electrically conductive portion of the probe tip is engaged with the electrically conductive portion of the storage medium.

FIG. 4 shows a cross-sectional view of a probe 18 and a portion of the storage substrate 10. A dent 26 is formed in the electrically conductive layer 30, with the dent 26 being part of a corresponding storage cell. Also, in some implementations, an electrical conductor 152 is provided underneath the electrically conductive layer 30. The electrical conductor 152 is in the form of an electrically conductive trace that is routed between the storage cell and sensing devices in the peripheral circuitry 52 or 54. More than one storage cell can share the electrical conductor 152.

Figure 5:
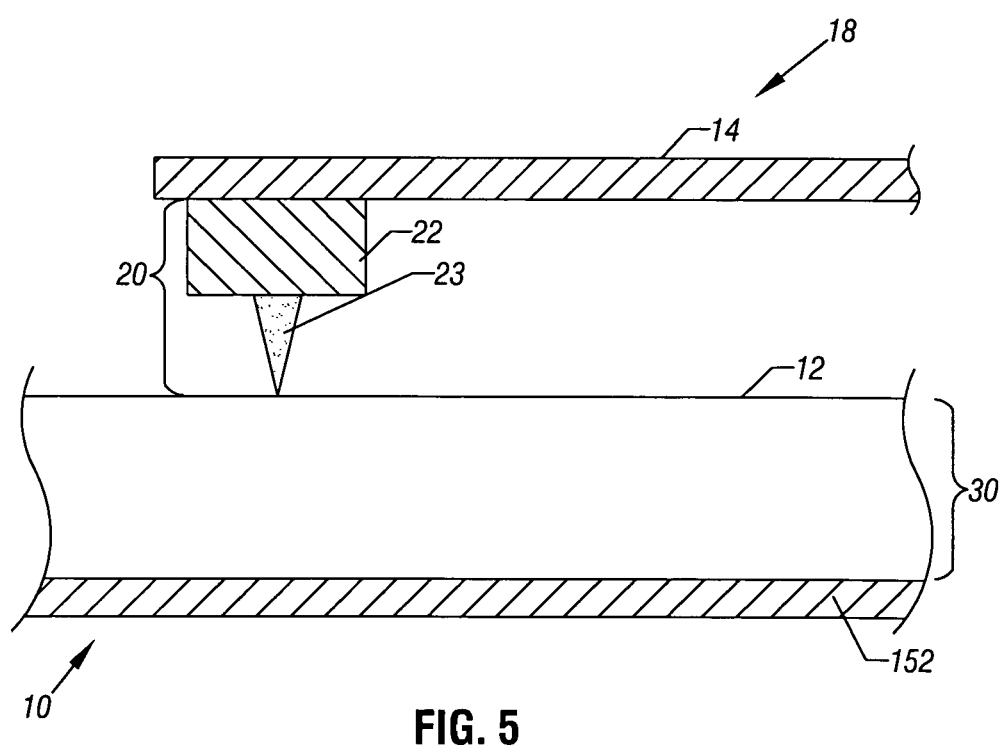
FIG. 5 is a cross-sectional view of the probe and storage medium of FIG. 1, where the conductive portion of the probe tip is spaced apart from the electrically conductive portion of the storage medium.

FIG. 4 shows the tip 20 of the probe 18 being engaged in the dent 26 such that the second portion 23 of the tip 20 is located inside the dent 26 and the base portion 22 of the tip 20 is electrically contacted to the storage surface 12. As a result, electrical communication is achieved between the probe 18 and the electrical conductor 152 through the electrically conductive layer 30. On the other hand, as shown in FIG. 5, if the tip 20 is not engaged in a dent, the base portion 22 is spaced apart from the storage surface 12 by the electrically insulating second portion 23 being engaged on the storage surface 12. In this position, no electrical communication is established between the probe 18 and the electrically conductive layer 30 or the electrical conductor 152.

Several techniques can be used to detect for electrical communication of the probe 18 and the storage medium. In a first technique, a current source (which can be provided in the peripheral circuitry 52 or 54 of FIG. 2) is capable of driving a predetermined electrical current through the cantilever 14 (also formed of an electrically conductive material) and the base portion 22 into the layer 30 once electrical contact is made between the base portion 22 and the storage surface 12. The electrical current is returned by the electrical conductor 152. The presence of predetermined electrical current through the cantilever 14 (or through the electrical conductor 152) is an indication that a dent 26 has been encountered by the probe 18. The current is detected by a current sensor in the peripheral circuitry 52 or 54 (FIG. 2).

In a second technique, a voltage is provided at the cantilever 14, and a voltage sensor in the peripheral circuitry (52 or 54 in FIG. 2) detects whether a voltage is induced in the electrical conductor 152. When the base portion 22 makes electrical contact with the storage surface 12, and a voltage is applied at the cantilever 14, electrical conductance between the base portion 22 through the electrically conductive layer 30 causes the electrical conductor 152 to be driven to the same voltage (or substantially the same voltage) as the cantilever 14.

In a third technique, a voltage difference can be induced between the cantilever 14 and the electrical conductor 152. Such a voltage difference is possible due to the resistance associated with layer 30 and the base portion 22. When a voltage difference is generated across the cantilever 14 and the electrical conductor 152, and the base portion 22 is electrically contacted to the storage surface 12, a current is induced through the cantilever 14, base portion 22, layer 30, and the conductor 152. This current is detected by a current sensor in the peripheral circuitry 52 or 54 (FIG. 2).

If plural probes 18 are present in the storage device, then plural current or voltage sensors in the peripheral circuitry 52 or 54 (FIG. 2) are associated with respective probes 18 to detect for respective current or voltage signals to determine whether or not dents in storage cells have been encountered by the probes.

Note that the electrical conductor 152 underneath the layer 30 can be omitted in other embodiments. In such other embodiments, electrical contact by the base portion 22 with the storage surface 12 enables current to flow from the cantilever 14 generally into the layer 30. Such a current can be detected by peripheral circuitry.

Figure 6:
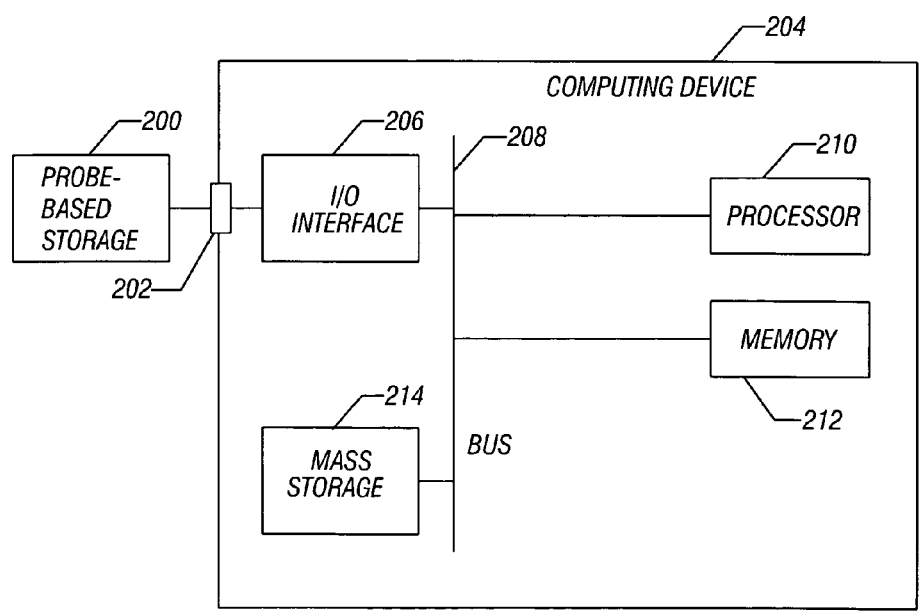
FIG. 6 is a block diagram of a system that includes a computing device having a port to connect to a probe-based storage device that incorporates an embodiment of the invention.

The probe-based storage device according to some embodiments can be packaged for use in a computing system. For example, as shown in FIG. 6, a probe-based storage device 200 that incorporates the probe having the electrically conductive base portion and a storage medium having an electrically conductive layer is attached or connected to an I/O (input/output) port 202 of a computing device 204. The I/O port 202 can be a USB port, a parallel port, or any other type of I/O port. Inside the computing device 204, the I/O port 202 is connected to an I/O interface 206, which in turn is coupled to a bus 208. The bus 208 is coupled to a processor 210 and memory 212, as well as to mass storage 214. Other components may be included in the computing device 204. The arrangement of the computing device 204 is provided as an example, and is not intended to limit the scope of the invention. In alternative embodiments, instead of being coupled to an I/O port of a computing system, the probe-based storage device can be mounted (directly or through a socket) onto the main circuit board of the computing system.

In the foregoing description, numerous details are set forth to provide an understanding of the present invention. However, it will be understood by those skilled in the art that the present invention may be practiced without these details. While the invention has been disclosed with respect to a limited number of embodiments, those skilled in the art will appreciate numerous modifications and variations therefrom. It is intended that the appended claims cover such modifications and variations as fall within the true spirit and scope of the invention.

What is claimed is:

1. A storage device comprising: a probe having a tip, the tip comprising a first portion and a second portion; and a storage medium having a surface, wherein the tip of the probe is adapted to form a dent in the storage medium, wherein the second portion of the tip is electrically contacted to the surface of the storage medium in response to the first portion being engaged in the dent, and wherein the second portion of the tip is spaced apart from the surface of the storage medium in response to the first portion being engaged on the surface of the storage medium and not engaged in the dent.

2. The storage device of claim 1, wherein the first portion is formed of an electrically insulating material, and the second portion is formed of an electrically conductive material.

3. The storage device of claim 2, wherein the storage medium has an electrically conductive layer adjacent the surface of the storage medium, the electrically conductive layer to electrically communicate with the probe in response to the second portion of the tip being electrically contacted to the surface.

4. The storage device of claim 3, further comprising an electrical conductor, wherein the electrically conductive layer is positioned between the electrical conductor and the surface of the storage medium, wherein at least one of a voltage signal and a current signal is induced in the electrical conductor in response to electrical contact of the second portion of the tip with the surface of the storage medium.

5. The storage device of claim 3, wherein the electrically conductive layer is formed of a material including polymer doped with electrically conductive elements.

6. The storage device of claim 1, wherein the probe has a cantilever, the tip protruding from the cantilever, and wherein the cantilever is formed of an electrically conductive material, the cantilever adapted to provide at least one of a voltage and current to the second portion of the tip.

7. The storage device of claim 1, further comprising a second probe having a tip adapted to form a second dent in the storage medium, the tip of the second probe having a first electrically insulating portion and a second electrically conductive portion, wherein the second electrically conductive portion electrically contacts the surface of the storage medium in response to the first electrically insulating portion of the tip of the second probe being engaged in the second dent, and wherein the second electrically conductive portion of the tip of the second probe is spaced apart and electrically isolated from the surface of the storage medium in response to the first electrically insulating portion of the tip of the second probe not being engaged in the second dent.

8. The storage device of claim 1, further comprising a sensor device to detect at least one of a predetermined voltage and a predetermined current in response to electrical contact of the second portion of the tip with the surface of the storage medium.

9. The storage device of claim 1, further comprising storage cells formed in the storage medium, wherein the storage medium and the probe are moveable with respect to each other to enable the probe to write to and read from the storage cells.

10. The storage device of claim 1, wherein the probe comprises a nanotechnology probe.

11. The storage device of claim 1, wherein the tip of the probe is adapted to form the dent in the storage medium during a write operation, and wherein the probe is adapted to detect the dent during a read operation.

12. A system comprising: a processor; and a storage device comprising: a probe having a tip; and a storage medium having storage cells, the tip of the probe adapted to program the storage cells by forming a dent in a first storage cell and not forming a dent in a second storage cell, the tip having an electrically conductive portion that is electrically contacted to a surface of the storage medium in response to the tip of the probe being engaged in the dent of the first storage cell, and the electrically conductive portion of the tip of the probe being spaced apart from the surface of the storage medium in response to the tip not being engaged in a dent in the second storage cell.

13. The system of claim 12, wherein the probe has a cantilever, and the electrically conductive portion comprises a base portion that is attached to the cantilever, the probe further having an electrically insulating portion that protrudes from the base portion, wherein the electrically insulating portion is adapted to engage the surface of the storage medium.

14. The system of claim 13, wherein the electrically insulating portion of the tip is provided into the dent of the first storage cell in response to the tip being positioned at the first storage cell.

15. The system of claim 12, wherein the storage device further comprises a sensor device to detect at least one of a voltage signal and a current signal in response to the electrically conductive portion of the base being electrically contacted to the surface of the storage medium.

16. The system of claim 15, wherein the sensor device does not detect the at least one of the voltage signal and the current signal in response to the electrically conductive portion of the tip being spaced apart from the surface of the storage medium.

* * * * *